US006965213B2

United States Patent
Schadoffsky et al.

(10) Patent No.: US 6,965,213 B2
(45) Date of Patent: Nov. 15, 2005

(54) BATTERY PACK WITH VERTICAL CELLS AND SLIDE IN LATCH

(75) Inventors: Olaf Schadoffsky, Landsberg (DE); Rainer Ontl, Landsberg (DE)

(73) Assignee: Hilti Aktiengesellschaft, Schaan (LI)

( * ) Notice: Subject to any disclaimer, the term of this patent is extended or adjusted under 35 U.S.C. 154(b) by 90 days.

(21) Appl. No.: 10/612,351

(22) Filed: Jul. 2, 2003

(65) Prior Publication Data
US 2004/0070367 A1 Apr. 15, 2004

(30) Foreign Application Priority Data
Jul. 3, 2002 (DE) .......................... 102 29 980

(51) Int. Cl.[7] ................................................ H02J 7/00
(52) U.S. Cl. ..................... 320/112; 320/110; 320/107
(58) Field of Search ................................ 320/107, 110, 320/312; 429/99, 100, 120; 403/109.3

(56) References Cited

U.S. PATENT DOCUMENTS 6,057,608 A  *  5/2000  Bailey et al. ................. 307/43
6,326,101 B1     12/2001 White et al.
6,467,747 B1  * 10/2002  Ellsworth .................... 248/548
6,537,694 B1  *  3/2003  Sugiura et al. ............. 429/120

* cited by examiner

Primary Examiner—Michael Sherry
Assistant Examiner—Robert Grant
(74) Attorney, Agent, or Firm—Sidley Austin Brown & Wood, LLP

(57) ABSTRACT

A battery pack (1) has a housing (2) with a floor part (5) and side walls (6.1, 6.2, 6.4; 8.1, 8.2, 8.4). The side wall (6.1, 8.1) has a recess (10.1, 11.1) oriented towards the inside of the housing. A plurality of cells arranged vertical to the floor part (5) are arranged in the housing (2). An actuation means (12.1) is provided in the recess (10.1, 11.1) for actuating the latching device and unlatching the detent element (13.1) from the receptacle of the electrical appliance. The actuation means (12.1) is guided on a guide means displaceable relative to the housing (2), and a translatory axis of the actuation means (12.1) is oriented vertical to the side wall (6.1, 8.1) and parallel to the floor part (5).

6 Claims, 3 Drawing Sheets

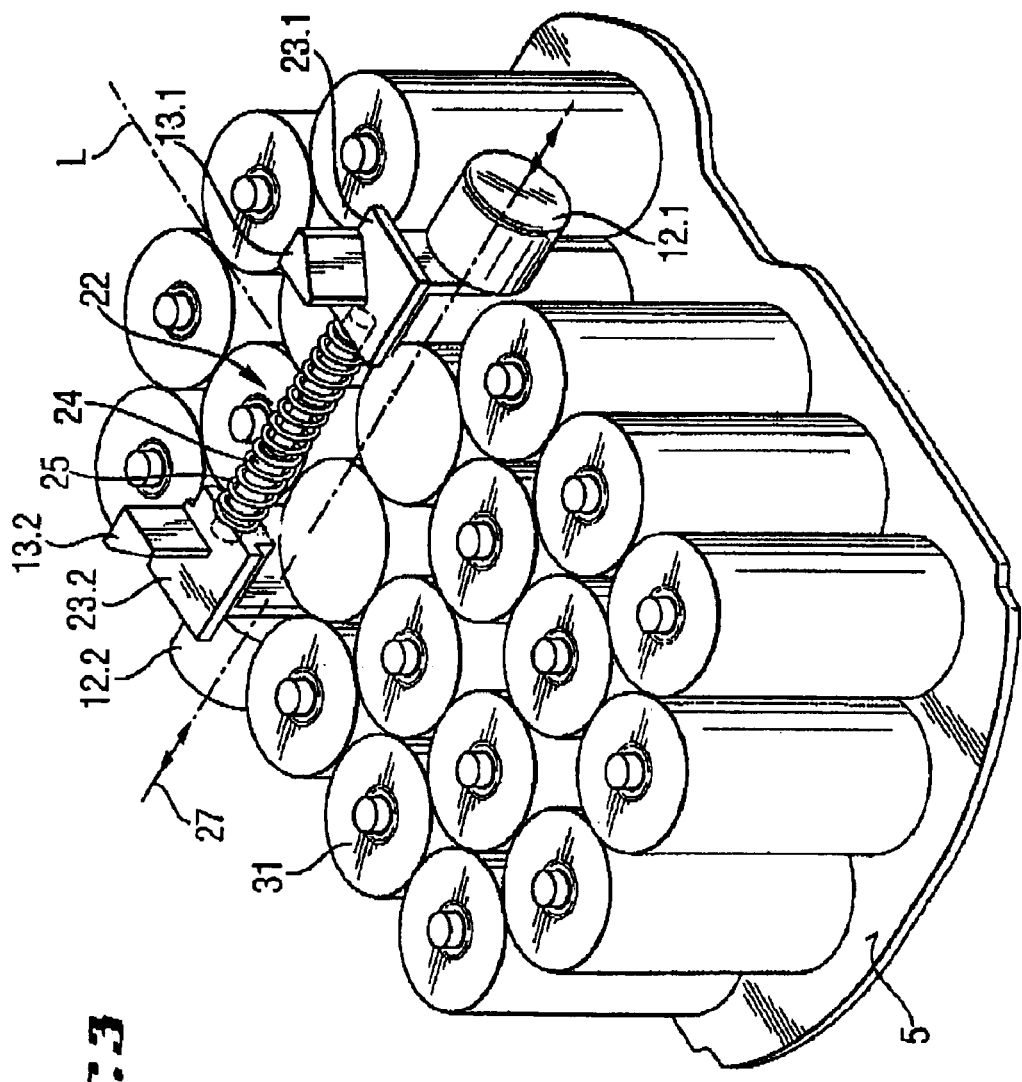

BATTERY PACK WITH VERTICAL CELLS AND SLIDE IN LATCH

FIELD OF THE INVENTION

The invention relates to a battery pack with a housing having a floor part and at least two side walls running parallel to each other and perpendicular to the floor part, wherein the housing has at least a recess at one of the side walls oriented towards the inside of the housing, a plurality of cells inside the housing oriented perpendicular to the floor part and a locking mechanism with at least one actuation means for unlocking the locking mechanism arranged in at least one recess.

BACKGROUND OF THE INVENTION

Battery packs can be used in cordless electrical appliances with chargeable storage cells for skilled workers, professionals and widely used routine use. For example, nickel-cadmium or nickel-metal hybrids battery cells are used as the storage cells, wherein several such cells are combined to form a battery pack. In the discharged state of the battery pack, the cells can be recharged using a charger device. Embodiments are well-known, in which the battery pack is detachably connected to the cordless electrical appliance to assure that the electrical appliance can be used without prolonged downtimes.

The battery pack is detached from the electrical appliance and charged in a charger Meanwhile, a second, charged battery pack can be connected to the cordless electrical appliance for continued usage while the first battery pack is charging. If the second battery pack discharges, the first battery pack, which has been charged in the interim, can again be connected to the cordless electrical appliance and the second battery pack can be charged in the charger device.

U.S. Pat. No. 6,326,101 discloses a chargeable battery pack that can be detachable connected to an electrical tool. A plurality of vertical cells are arranged in a housing. The battery pack is detachably connected to the electrical appliance using a snap-in mechanism that includes pivotable locking tabs relative to the housing.

Along with small devices, electrical appliances for professional use are increasingly becoming available in cordless configurations. The battery packs have a large number of heavy storage cells depending on the electrical voltage (e.g. 12 V or 24 V). The drawback in the conventional system is that the battery pack, especially in 12 V electrical voltage systems and higher, is quite heavy. Handling such large battery packs is awkward. Furthermore, the battery packs are very sensitive to impact, and thus the well-known snap-in mechanism only conditionally meets the demands of a battery pack over its service life. The possibility to construct a compact battery pack is limited since the locking tabs pivotable relative to the housing require a certain space for their functionality.

SUMMARY OF THE INVENTION

The object of the present invention is to provide a battery pack that is structurally compact and easy to handle. In addition, the battery pack must be securely attachable to the cordless electrical appliance.

This object is achieved according to the invention by a battery pack having a housing, wherein the housing has a floor part and at least two side walls running essentially parallel to each other and arranged almost perpendicular to the floor part. The housing has at least one recess at at least one of the side walls that is oriented towards the inside of the housing. Additionally, the battery pack includes a plurality of cells arranged in the housing perpendicular to the floor part. Moreover, the battery pack has a locking device with at least one actuation means for unlatching the locking device, which is arranged in the at least one recess. The at least one actuation means is guided on a guiding means displaced relative to the housing. A translational axis of the at least one actuation means is oriented almost perpendicular to the side wall and almost parallel to the floor part, The structural height of the inventive system with the at least partially translatory guided actuation means is only minimally greater than the structural height in the known hinged or flexural mechanism. In comparison to the hinged or flexural mechanism, greater movements of the actuation means can be effected in the inventive system such that even heavier battery packs can be adequately secured. The inventive system can be easily operated as a result of the arrangement of the actuation means in the recess of the side wall of the housing. The at least one recess is preferably provided in a flat surface of a respective side wall. The actuation means are, for example, configured as push-buttons that have a large contact surface. As a result of this arrangement, handling of the battery pack is simplified. If, for example, the battery pack is suspensively attached to the electrical appliance using a rocker mechanism, in the battery pack of the invention, then changing between different grip positions, as is the known pivot- and flexure mechanisms, is unnecessary when attaching and detaching the battery pack.

The at least one actuation means is preferably configured so that it is guided in the opening of the groove over its entire stroke. In this manner, the at least one actuation means will not wedge or jam when it is used. In addition, guide rails for guiding the at least one actuation means can be provided on the floor part or the cover part.

A large portion of the structural space for the latching device and the at least one actuation means is housed in the spaces in the cell arrangement of the battery pack. In a first level, which runs through the at least one actuation means or the at least one recess in the side wall of the housing, a smaller number of cells is arranged between the side walls of the housing than in a second level, which runs parallel to the first level.

Preferably, the guide means includes a guide bar. The at least one actuation means is preferably configured as an additional guide means of the at least one actuation means, so that the translatory movement is possible, over the entire working life of the battery pack. The guide rod can, for example, be fabricated out of an elastic, compressible material. When the push-button is actuated there is a compression of the guide bar and the length of the guide bar is shortened. After release of push-button, the guide bar urges against its original length and thus restores the push-button back to its starting position. The guide bar is, for example, passed through the housing and is supported on the side wall situated opposite the side wall having the actuation means or the recess. The guide bar can also be configured such that the guide of the at least one actuation means along its translatory axis occurs only or predominantly via the guide bar.

In a variant embodiment, the guide means can be configured as a Z-shaped lever that, upon actuating the actuation means, moves in a plane running essentially vertical to the respective side wall. In this embodiment, the actuation means also moves along the aforementioned translatory axis. Using such an embodiment, a more minimal structural height can be achieved for the battery pack than when a guide means passing through the housing.

Advantageously, a spring means is arranged coaxial on the guide means against for providing resilient support for each actuation means. The guide means is, for example, configured telescopically in two parts and enclosed by a helical spring. The overall length of the guide bar shortens and the helical spring is compressed when the actuation means is operated. The helical spring expands after the release of the actuation means. When the helical spring expands, the compressed guide bar is extended to its original length and the actuation means can return to its original position. The guide means and the spring means can be combined into one component. For example, the guide means can be configured as a piston spring.

Preferably, the spring element has a very low progression. The spring element is chosen such that in an actuated actuation means, in which a low spring force is desirable, and in the holding position, in which a high spring force is desired, the spring element are essentially similar. If the spring element exhibits a high progression, the force for actuating the actuator means is usually high and the force for securing the battery pack to the electrical appliance is, however, low.

Preferably, the latching device comprises two actuation means and the side walls each have a recess. The fitness for purpose and handling of the battery pack, in such an embodiment, is substantially improved. On the one hand, the battery pack is detachably held on the electrical appliance at at least two points and, on the other hand, the battery pack is easier to detach from the electrical appliance. If, for example, the battery pack is stuck on the electrical appliance, by user error or distortion of the housing of the battery pack, the battery pack can in the majority of instances be loosened at at least one actuation means and detached from the electrical appliance using ancillary tools.

Preferably, the recesses are configured opposite to each other on the side walls. In this embodiment type, the operation of the actuation means is simplified for single-handed operation. The battery pack is, for example, held from below or from the rear with one hand and the actuation means can be operated using two fingers. The risk of the battery pack falling to the floor, at the time of attaching or detaching, is reduced to a minimum.

Preferably, the at least one recess is configured to be open towards the floor part. In this embodiment, even battery packs with larger dimensions, for example, 36 V battery packs, can be gripped with one hand. Additionally, operation of the actuation means is possible with smaller hands.

BRIEF DESCRIPTION OF THE INVENTION

The preferred embodiments and combinations of the features of the invention will be described further with reference to the following drawings, wherein:

FIG. 3 shows a perspective partial view of the battery pack according to the invention.

DETAILED DESCRIPTION OF THE INVENTION

Figure 1:
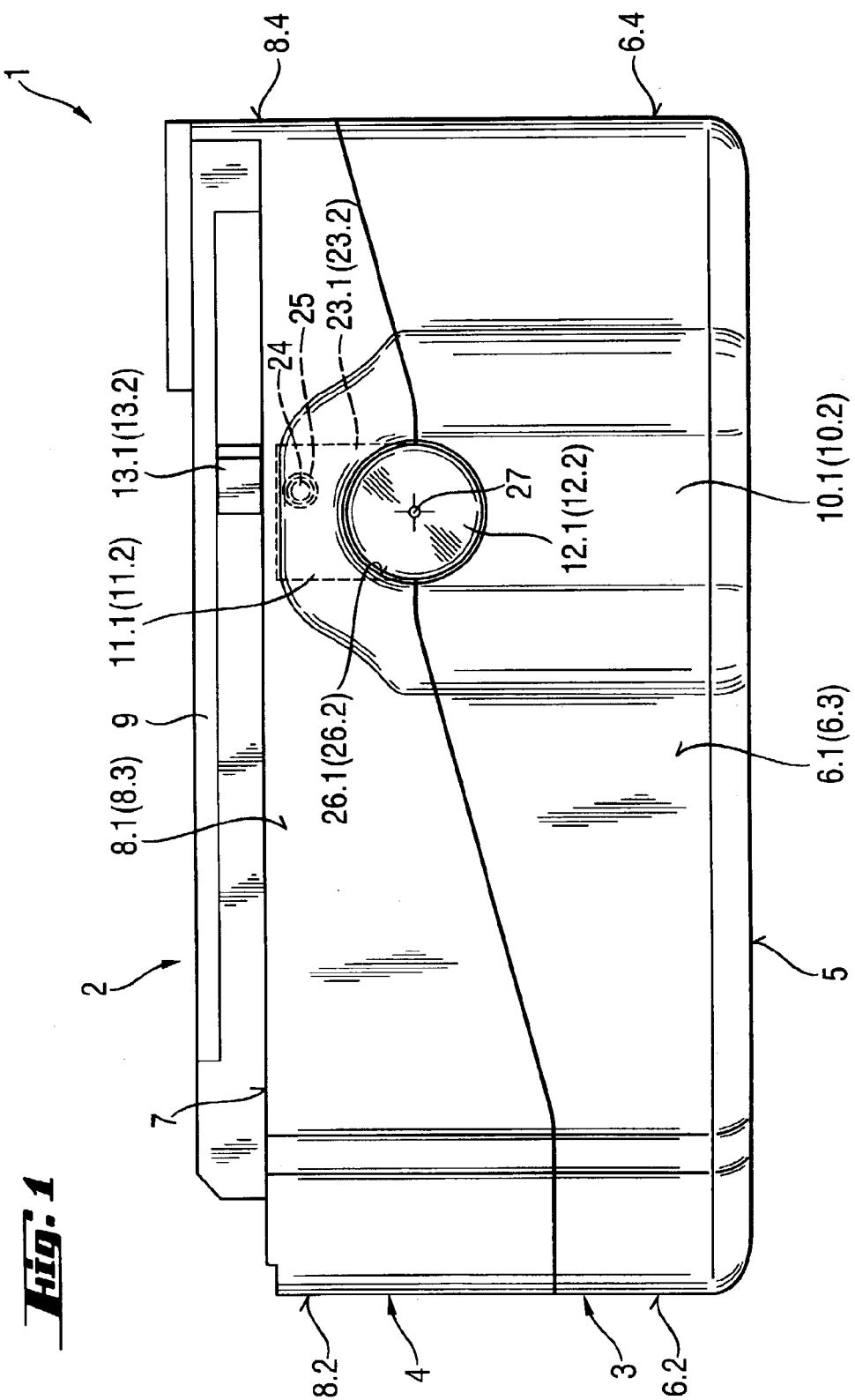
FIG. 1 shows a side view of the battery pack of the invention.

A side view of a battery pack according to the invention is shown in FIG. 1. The battery pack 1 has a two-part housing 2, which includes a bottom shell 3 and a cover shell 4. The bottom shell 3 has a floor part 5. Side walls 6.1 to 6.4 (the side wall 6.3 is obscured in this representation by the side wall 6.1) are vertically arranged at the edges of the floor part 5. The cover shell 4 has a cover part 7 and side walls 8.1 to 8.4 (the side wall 8.3 is obscured in this representation by side wall 8.1). Guide means 9 are arranged on the cover part 7. The guide means can engage into respective complementary engaging means on the electrical appliance (not shown herein).

The side walls 6.1 and 6.2 and 8.1 and 8.2 are each provided with a recess 10.1 and 10.2 or 11.1 and 11.2 that in the assembled state of the bottom shell 3 and the cover shell 4 is open towards the floor part 5. Push-buttons 12.1 and 12.2 are disposed in the recesses 11.1 and 11.2 for unlatching the latching device. The push-buttons 12.1 and 12.2 each operate a detent element 13.1 and 13.2 that holds the battery pack 1 in the attached condition on the electrical appliance. The recesses 10.1 and 11.1 are ergonomically configured such that the push-buttons 12.1 and 12.2 can be operated with one finger and the battery pack can be securely gripped with one hand when the battery pack is attached or detached onto the electrical appliance. The risk of the battery pack 1 falling to the floor when being attached or detached and, thus, being rendered unusable due to impact damage is reduced.

Figure 2:
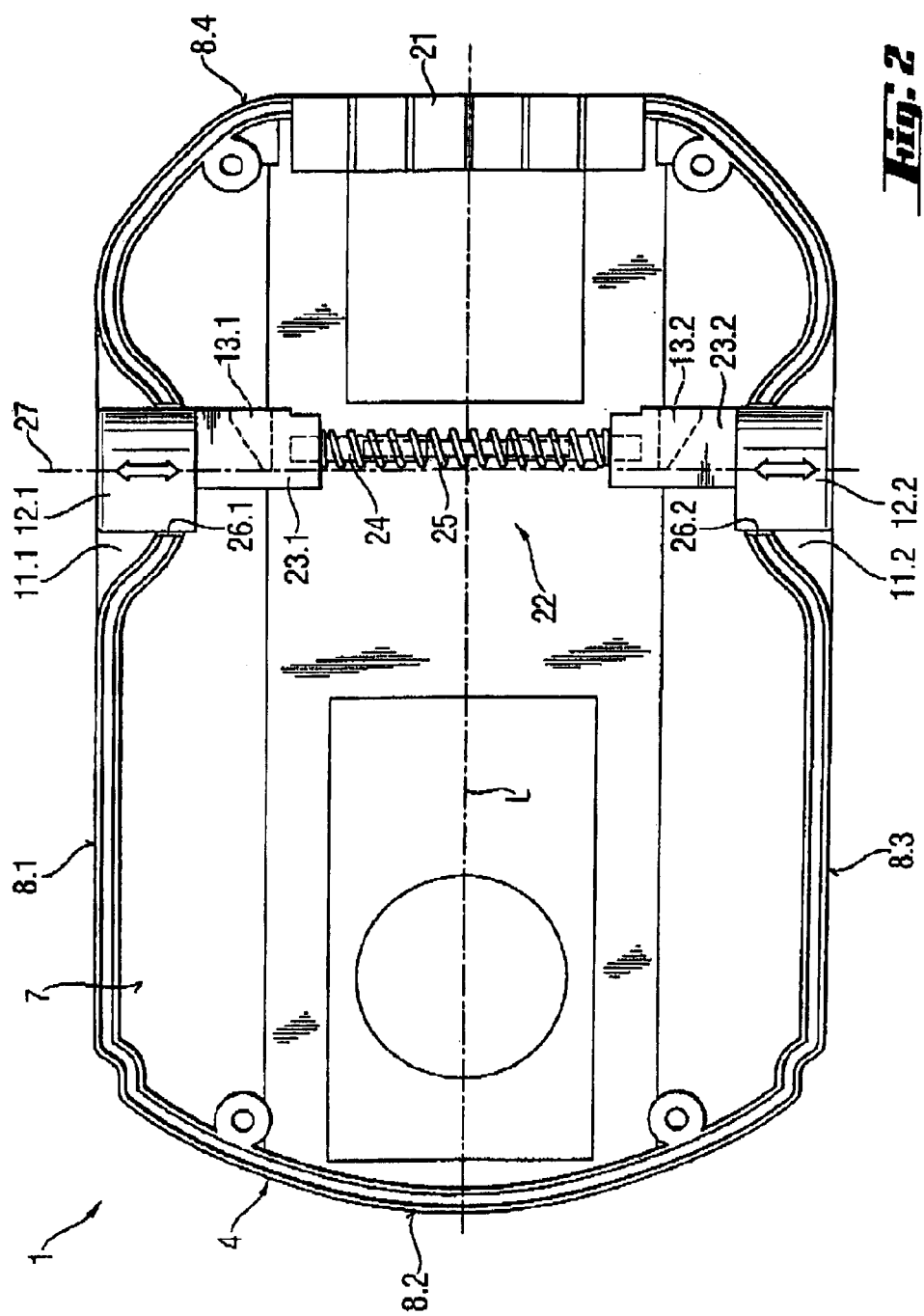
FIG. 2 shows a view onto the cover shell of the battery pack according to the invention.

FIG. 2 shows a view from above onto the cover shell 4 of the battery pack 1 according to the invention. The side walls 8.1 to 8.4 are arranged perpendicular to the cover part 7 of the cover shell 4. On the side wall 8.4, the contact elements 21 can be seen, which establish the contact between the cells and the connection on the electrical appliance of the installed battery pack 1. The latching device 22 runs from the side wall 8.1 to the side wall 8.3 through the housing of the battery pack and encompasses, at each of its two ends, push-buttons 12.1 and 12.2, which are disposed in the recesses 11.1 and 11.2 of the side walls 8.1 and 8.3 and with the transitional parts 23.1 and 23.2 and a telescoping bar 24, and on which a helical spring 25 is coaxial arranged. The push-buttons 12.1 and 12.2 are configured such that they are led into the openings 26.1 or 26.2 in the recesses 11.1 and 11.2 along the transitional axis 27. In this way, the push-buttons 12.1 and 12.2 are prevented from rendering the latching device 22 unusable upon operation.

Upon operating the push-buttons 12.1 and 12.2 they are urged translateral in opposition and the telescoping bar 24 is compressed. The edges of the transition parts 23.1 and 23.2 come into contact with the ends of the helical spring 25 such that the spring 25 is compressed. The detent elements arranged on the transition parts 23.1 and 23.2 are also moved on the inside of the housing, whereby the battery pack can be detached from the electrical appliance. After releasing the push-buttons 12.1 and 12.2, the helical spring 25 expands to its original length, whereby the telescoping bar 24 is also extended to its original length, until the push-buttons 12.1 and 12.2 are brought into their starting positions. Should the battery pack be re-attached to the electrical appliance, the push-buttons 12.1 and 12.2 are once again operated, the battery pack installed on the electrical appliance and the push-buttons 12.1 and 12.2 released. The detent elements 13.1 and 13.2 engage in the respective configured receptacles on the electrical appliance and the battery pack is held securely on the electrical appliance.

A diagrammatic, perspective partial view of the battery pack according to the invention is represented in FIG. 3. By way of cutaway section, the floor part 5 is represented and the number cells 31 corresponding to the electrical voltage (e.g., 12 V, 24 V, 36 V, etc.) are arranged thereon and vertically thereto. In the level that runs through the latching device 22, a smaller number of cells 31 are arranged than the number of cells 31 arranged in the other levels running parallel to this level. In this manner, a necessary open space is created inside the battery pack that makes the translatory movement of the push-buttons 12.1 and 12.2 possible. The telescoping bar 24 with the helical spring 25 arranged coaxial thereon is led over the cells 31. The detent elements 13.1 and 13.2, which can be brought into engagement with the respective configured receptacles on the electrical appliance, project from the battery pack. The battery pack can be compactly produced with only minimally greater height than the height required by the height of the cells 31 because of the minimal height of the latching device 22.

Thus, a battery pack is provided that is compactly constructed and makes simple handling possible At the same time, the fitness for purpose of the battery pack is assured over the service life of the cells.

What is claimed is:

1. A battery pack (1) having a housing (2), wherein the housing (2) has a floor part (5) and at least two side walls (6.1, 8.1; 6.3, 8.3) running almost parallel to each other and almost perpendicular to the floor part (5), wherein the housing (2) has a recess (10.1; 10.2; 11.1; 11.2) at at least one side wall (6.1, 8.1, 6.3, 8.3) oriented towards the inside of the housing, a plurality of cells (31) arranged vertical to the floor part (5) in the housing (2) and a latching device (22) with at least one actuation means (12.1, 12.2) for unlatching the latching device (22) arranged in the at least one recess (10.1, 10.2, 11.1, 11.2), wherein the at least one actuation means (12.1, 12.2) is guided on a guide means displaceable relative to the housing (2), a translatory axis (27) of the at least one actuation means (12.1, 12.2) is oriented almost vertical to the side wall (6.1, 8.1; 6.3, 8.3) and almost parallel to the floor part (5).

2. The battery pack of claim 1, wherein the guide means includes a guide bar (24).

3. The battery pack of claim 1, wherein a spring means (25) is arranged coaxial on the guide means and each of the actuation means (12.1, 12.2) resiliently abuts the, spring means (25).

4. The battery pack of claim 3, wherein the latching device (22) has two actuation means (12.1, 12.2) and the side walls (6.1, 8.1; 6.3, 8.3) each have a recess (10.1, 10.2, 11.2; 11.2).

5. The battery pack of claim 4, wherein each recess (10.1, 10.2, 11.2; 11.2) is opposite another recess (10.1, 10.2, 11.1; 11.2) on the side walls (6.1, 8.1; 6.3, 8.3).

6. The battery pack of claim 5, wherein at least one recess (10.1, 10.2, 11.1; 11.2) is open towards the floor part (5).

* * * * *